2,948,689
PHOSPHINOBORINE COMPOUNDS AND THEIR PREPARATION

Anton B. Burg, Los Angeles, and Ross I. Wagner, Montebello, Calif., assignors, by mesne assignments, to American Potash & Chemical Corporation, a corporation of Delaware No Drawing. Filed Nov. 8, 1957, Ser. No. 695,230

17 Claims. (Cl. 260—2)

This application, which is a continuation-in-part of our copending application, Serial No. 446,147, filed July 27, 1954, now abandoned, relates in general to phosphinoborines and their production and, more particularly, to phosphinoborines incorporating methylene, polymethylene, phenylene or polyphenylene groups which have more than a single phosphorus atom in each of the units included within the polymeric substances. In other words, the number of phosphinoborine units total at least two per repeating unit of the polymeric substance.

It is an object of this invention to provide a group of basically inorganic polymers having unusual chemical properties, particularly when used in those applications where phosphorus and boron-containing materials find utility.

A further object of this invention is to provide methods for synthesizing phosphinoborine polymers.

Ancillary objects and advantages of this invention, if not specifically set out, will become apparent during the course of the detailed description which follows:

Broadly, it has been found that polymeric phosphinoborines may be prepared which have unusual properties, as set forth below.

These phosphinoborines form polymers including a number of units joined one to another through the phosphorus and boron atoms, each of the units having the general formula:

$$[R'''R''''BP(R')R(R'')PBR'''R'''']_n$$

where R is methylene, polymethylene, phenylene or polyphenylene and R', R'', R''' and R'''' are the same or different, these symbols representing H or hydrocarbon. Where neither R' nor R'' is hydrogen, the polymeric product obtained will be composed largely of trimeric or tetrameric cyclic phosphinoborines of the following general configuration linked to other similar rings through the methylene, polymethylene, phenylene or polyphenylene radical.

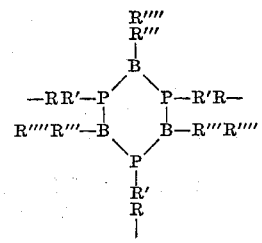

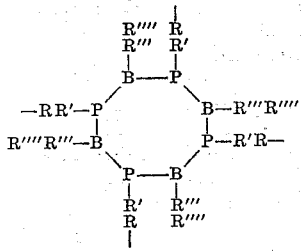

Obviously, one or more of the R' groups in the formulae above may be an R''.

Where one or both P atoms in the phosphine borine unit subtends two H atoms, the product will be a linear material rather than a ring and will require further treatment as set out below to replace any H atoms depending from the P atoms of the phosphinoborine with alkyl radicals. As may be seen from the foregoing, the subscript "n" appearing in the general formula is an integer indicative of the degree of polymerization but cannot be defined with accuracy, for the size of any given polymer molecule may vary substantially from that of another produced under slightly different reaction conditions. Further, polymers of varying molecular sizes will be secured in any given batch of product.

If two different phosphinoborine monomer units, at least one of which subtends a radical having a P atom as a part thereof, are copolymerized, the properties of the resulting phosphinoborine copolymer may be varied over a wide range. Lesser quantities of higher polymers will be present in admixture with the trimeric and tetrameric rings.

The products of this invention may be produced through pyrolysis of the corresponding phosphine borine or by the dehydrohalogenation of the corresponding phosphine haloborine. Preferably, where it is desired to prepare a phosphinoborine having only hydrogen atoms depending from the boron atoms, pyrolysis is used while dehydrohalogenation is used where the phosphinoborine secured has hydrocarbon groups bonded to the boron atoms or hydrogen bonded to the phosphorus.

More particularly, the preparation of certain of these phosphinoborines may be accomplished through the pyrolysis of the phosphine borine which corresponds to the phosphinoborine desired—the difference between the two compounds being in the presence of an extra hydrogen atom on each boron and phosphorus atom forming each phosphine borine complex. The pyrolysis is preferably carried out at a temperature of from about 80° C. to a maximum of about 350° C. Because of the relatively high temperatures employed, the pyrolysis method is suitable only where the phosphinoborine product secured is relatively stable and where the phosphine borine being treated will not undergo disproportionation. Thus, pyrolysis may be used where hydrogens solely are bonded to the boron atoms and where a single hydrogen is bonded to each phosphorus of the phosphine used.

It can be determined that the phosphine borine has been fully reacted when a point is reached where no further hydrogen evolves from the material in the reaction vessel. It is advantageous to pass the $H_2$ evolved by the reaction into a mercury bubbler—thus affording an easy method of ascertaining when the reaction is complete. A period of 30 to 90 minutes will ordinarily be sufficient where no solvent is present and the phosphine borine is refluxed.

The pyrolysis may be also carried out in a refluxing solvent of high boiling point such as n-butyl ether or triethylene glycol dimethyl ether. Alternatively, the phosphine borine may be pyrolyzed in the absence of a solvent either in the liquid or vapor phase, but in an inert atmosphere such as hydrogen, nitrogen or any other inert gas.

Also, a phosphine haloborine may be treated in solution with a tertiary amine which is capable of removing the elements of a hydrohalogen acid (including HCl, HBr or HI) from the phosphine haloborine in the form of an insoluble substituted ammonium salt. Such tertiary amines are triethylamine and dimethylaniline. This reaction is most easily, and hence preferably, carried out at room temperature. However, temperatures of as low as 0° C. may sometimes be employed (the reaction becoming slower at this level) or as high as 100° C. with high boiling solvent—the reaction time decreasing with higher temperatures. The dehydrohalogenation reaction is suitable for the preparation of all of the products of this invention but should not be used in instances where pyrolysis will serve satisfactorily.

Certain of the difunctional phosphines used in the preparation of the products of this invention may be prepared as described in copending application, Serial No. 695,241, filed even date herewith for phosphines. This application describes the reaction:

$$2MPHR' + (CH_2)_nX_2 \rightarrow (CH_2)_n(PHR')_2 + 2MX$$

where M is an alkali metal, preferably sodium, lithium or potassium, R' is H, alkyl or aryl and $n$ is an integer from 1 to 7. Preparation of compounds of the type $(C_6H_4)_m(PH_2)_2$ may be accomplished by the reduction of compounds having the general formula $$(C_6H_4)_m(PX_2)_2$$

where $m$ is 1–3. These latter intermediates are prepared by the method set out in copending application Serial No. 695,225, filed even date herewith for organohalophosphines.

The reduction is accomplished in the fashion disclosed as suitable for the mono-derivative $C_6H_5PX_2$ by A. Michaelis, Ber., 7, 6 (1874), involving a direct reaction with HI to yield $C_6H_5PH_2$. Another suitable method involves use of procedures disclosed by H. Lecog, Bull. Soc. chim Belg., 42, 199 (1933), wherein the aromatic halophosphine is converted to $C_6H_5HPI_3$ followed by treatment with absolute alcohol [H. Kohler and A. Michaelis, Ber., 10, 807 (1877)]. The same reduction is much more easily accomplished by reduction with lithium aluminum hydride [R. J. Horvat and H. J. Furst, J. Am. Chem. Soc., 74, 562 (1952)].

Where it is desired to obtain compounds of the type $(C_6H_4)_m(PHR')_2$ where R' is an aromatic radical, compounds having the formula $R'PX_2$ where R' is aromatic (see the aforementioned copending application) are treated to yield the desired aromatic difunctional phosphine. The process is substantially that set forth in the said aforementioned copending application except that $R'PX_2$ is employed in place of the phosphorus trichloride which is used in the process of that application and reduction of the product (preferably with lithium aluminum hydride as aforementioned) is required.

For example, in the production $$p\text{-}C_6H_4[PH(1\text{-}C_{10}H_7)]_2$$

the material $1\text{-}C_{10}H_7PX_2$ is treated as follows:

$$1\text{-}C_{10}H_7PCl_2 + 2(CH_3)_2NH$$

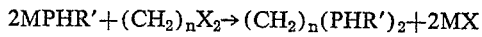
$$\rightarrow 1\text{-}C_{10}H_7PClN(CH_3)_2 + (CH_3)_2NH_2Cl$$

$$2\text{-}1\text{-}C_{10}H_7PClN(CH_3)_2 + p\text{-}C_6H_4Li_2$$

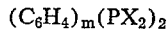
$$\rightarrow p\text{-}C_6H_4[P(1\text{-}C_{10}H_7)N(CH_3)_2]_2 + 2LiCl$$

$$p\text{-}C_6H_4[P(1\text{-}C_{10}H_7)N(CH_3)_2]_2 + 4HCl$$

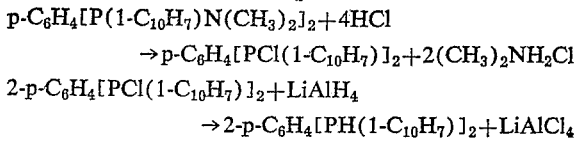
$$\rightarrow p\text{-}C_6H_4[PCl(1\text{-}C_{10}H_7)]_2 + 2(CH_3)_2NH_2Cl$$

$$2\text{-}p\text{-}C_6H_4[PCl(1\text{-}C_{10}H_7)]_2 + LiAlH_4$$

$$\rightarrow 2\text{-}p\text{-}C_6H_4[PH(1\text{-}C_{10}H_7)]_2 + LiAlCl_4$$

In a similar fashion $p\text{-}C_6H_4[PHC_6H_5]_2$ is prepared starting with commercially available $C_6H_5PCl_2$, $$p\text{-}C_6H_4[PH(C_6H_4\text{-}p\text{-}C_6H_5)]_2$$

prepared from $p\text{-}C_6H_5C_6H_4PCl_2$, $$p\text{-}C_6H_4[PH(p\text{-}ClC_6H_4)]_2$$

is prepared from $p\text{-}ClC_6H_4PCl_2$, etc.

The preparation of primary-secondary difunctional phosphines and unsymmetrically substituted secondary difunctional phosphines from $R(PH_2)_2$, set forth in part in our copending application, Serial No. 695,241, is rather straightforward. The syntheses are outlined by the following equations were M is an alkali metal such as sodium, X is halogen and R' and R" represent different alkyl radicals and R represents a methylene, polymethylene, phenylene or polyphenylene radical.

$H_2PRPHR'$ $$R(PH_2)_2 + M \rightarrow H_2PRPHM + \tfrac{1}{2}H_2$$

$$H_2PRPHM + R'X \rightarrow H_2PRPHR' + MX$$

$R''HPRPHR'$ (1) $\quad H_2PRPHR' + M \rightarrow MHPRPHR' + \tfrac{1}{2}H_2$ $\quad\quad MHPRPHR' + R''X \rightarrow R''HPRPHR' + MX$ (2) $\quad 4MPHR' + 4MPHR'' + 4RX_2 \rightarrow$ $\quad\quad 2R''HPRPHR'' + R''HPRPHR'' + R'HPRPHR' + 8MX$ Method 2 for the preparation of the unsymmetrically substituted difunctional phosphines gives a theoretical 50 percent yield of the unsymmetrically substituted product and, to be useful, the three products must be separable by means such as distillation, where the R' and R" must have considerably different molecular weights, or by fractional crystallization.

Immediately following, a number of illustrative examples appear showing use of one of the alternative methods of this invention, that termed the pyrolysis method. Phosphinoborines can be prepared having a wide variety of radicals bonded to one or another phosphorus atom of the difunctional phosphine used by this method. In general, the preparation of the phosphinoborine from the phosphine and diborane may be represented as follows where R is phenylene, polyphenylene or polymethylene and R' and R" are H or hydrocarbon radicals:

$$n'R'HPRPHR'' + n'B_2H_6 \xrightarrow{\text{heat}} n'H_3B\text{:}PH(R')R(R'')HP\text{:}BH_3 \xrightarrow{}$$

$$\tfrac{n'}{n}[H_2BP(R')R(R'')PBH_2]_n + 2n'H_2$$

*Example 1.*—p-Phenylene-P,P'-bis(methylphosphine diethylbromoborine), $$(C_2H_5)_2BrB\text{:}PH(CH_3)C_6H_4(CH_3)HP\text{:}BBr(C_2H_5)_2$$

was prepared by reacting 1.78 g. (p-methylphosphinophenyl)methylphosphine and 1.13 g. diethylbromoborine at 0° C. The addition compound was placed in a 250 ml. round bottom flask which had been flushed with nitrogen. Diethyl ether in the amount of 100 ml. was added to the reaction flask. Dimethylaniline in the amount of 0.920 g. was added to the reaction flask. Phenyldimethylammonium bromide was filtered from the reaction mixture after allowing the reaction to proceed 16 hours. The solvent was removed by distillation at reduced pressure. A high yield of p-phenylene-P,P'-bis-(methylphosphinodiethylborine) polymer, $$[(C_2H_5)_2BP(CH_3)C_6H_4(CH_3)PB(C_2H_5)_2]_n$$

was obtained.

*Example 2.*—Into an evacuated 30 ml. reaction tube were condensed 13.0 cc. (0.580 mmole) 1,3-bis(methylphosphino)propane and 12.8 cc. (0.571 mmole) of diborane. Formation of the phosphine borine coordination compound was evidenced by a rapid decrease of the vapor tension to zero. The tube was sealed and placed in a 190° C. oven for 55 hours. After cooling to −196° C., the tube was opened to the vacuum system and 25.6 cc. (99.4 percent of theory, based on $B_2H_6$) of hydrogen collected. The product, 1,3-trimethylene-P,P'-bis(methylphosphinoborine) polymer, having the composition

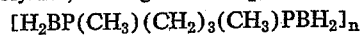

was a colorless, slightly elastic but friable solid that was insoluble in chloroform, carbon tetrachloride, benzene, cyclohexane, water, ethanol, acetone, diethylene glycol dimethyl ether, dioxane, pyridine, dimethylformamide, dimethylsulfoxide, carbon disulfide, nitrobenzene, and trimeric methylethylphosphinoborine.

*Example 3.*—The phosphine borines prepared in situ from 157.9 cc. (0.00705 mole) 1,3-bis(methylphosphino)-propane, 156.6 cc. (0.00711 mole) dimethylphosphine and excess diborane were sealed in a bulb after removal of excess diborane. The sealed bulb was heated at 195° C. for 14 hours. After removal of by-product hydrogen, the product was heated at 160° C. under high vacuum to remove O. 1117 g. of a mixture of dimethylphosphinoborine trimer and tetramer. The remaining colorless solid foam, comprised of dimethylphosphinoborine and 1,3-trimethylene-P,P'-bis(methylphosphinoborine) units in an approximately 0.8:1 ratio,

did not melt at temperatures up to 350° C. but did ignite spontaneously at 340–50° C.

In the examples which follow, the addition reaction by means of which the phosphine borine addition compound formed is caused to take place by condensing the phosphine and the borine reactants together in a nitrogen-flushed reaction vessel immersed in a Dry Ice bath and thereafter warming the vessel contents sufficiently to initiate the reaction. In no event is a temperature in excess of about 20° C. necessary to cause the addition reaction and temperatures as low as −50° C. occasionally are satisfactory. Each of the addition reactions described in Tables I and II was followed with a pyrolysis reaction wherein the phosphine borine addition compound was heated sufficiently to cause the evolution of hydrogen. This fact may be ascertained by passing the gas through a mercury bubbler. On termination of the reaction following conversion of all available phosphine borine material to the phosphinoborine (generally a period of ¾ to 3 hours at 170–220° C.), the hydrogen evolution stops. Alternatively, a sealed bulb such as that described in Example 2 may be used, in which event the reaction mixture is most conveniently heated for an extended period of time (e.g., 10–30 hours at 150–200° C.) in excess of the minimum necessary to convert the phosphine borine to the phosphinoborine. Thus, when the sealed bulb is opened, there is no question but that only the phosphinoborine and hydrogen will be found. No solvent was employed in the addition reactions or the pyrolysis reactions set out in Table I.

TABLE I
*Phosphinoborines from symmetrically substituted diphosphines—Pyrolysis process*

| No. | Diphosphine | Diphosphine mmoles | Diphosphine cc. | Diborane mmoles | Diborane cc. | Phosphine Borine Intermediate | Pyrolysis hrs. | Pyrolysis ° C. | Phosphinoborine Polymer Product |
|---|---|---|---|---|---|---|---|---|---|
| 4  | $(CH_2)_7(PHC_6H_5)_2$ | 0.473 | 10.6 | 0.469 | 10.5 | $(CH_2)_7[(C_6H_5)HP:BH_3]_2$ | 16 | 180 | $([CH_2]_7[(C_6H_5)PBH_2]_2)_n$ |
| 5  | $(CH_2)_4[PH(p\text{-}CH_3C_6H_4)]_2$ | 0.672 | 15.0 | 0.670 | 15.0 | $(CH_2)_4[(p\text{-}CH_3C_6H_4)HP:BH_3]_2$ | 25 | 180 | $([CH_2]_4[(p\text{-}CH_3C_6H_4)PBH_2]_2)_n$ |
| 6  | $(CH_2)_5[PH(p\text{-}BrC_6H_4)]_2$ | 0.532 | 11.9 | 0.534 | 12.0 | $(CH_2)_5[(p\text{-}BrC_6H_4)HP:BH_3]_2$ | 29 | 190 | $([CH_2]_5[(p\text{-}BrC_6H_4)PBH_2]_2)_n$ |
| 7  | $(CH_2)_5[PH(n\text{-}C_4H_9)]_2$ | 0.621 | 13.9 | 0.619 | 13.9 | $(CH_2)_5[(n\text{-}C_4H_9)HP:BH_3]_2$ | 30 | 180 | $([CH_2]_5[(n\text{-}C_4H_9)PBH_2]_2)_n$ |
| 8  | $(CH_2)_4[PH(n\text{-}C_8H_{17})]_2$ | 0.547 | 12.2 | 0.543 | 12.2 | $(CH_2)_4[(n\text{-}C_8H_{17})HP:BH_3]_2$ | 14 | 180 | $([CH_2]_4[(n\text{-}C_8H_{17})PBH_2]_2)_n$ |
| 9  | $(CH_2)_4[PH[2,4,6\text{-}(CH_3)_3C_6H_2]]_2$ | 0.596 | 13.4 | 0.583 | 13.1 | $(CH_2)_4[([CH_3)_3C_6H_2]HP:BH_3)$ | 20 | 170 | $[(CH_2)_4([(CH_3)_3C_6H_2PBH_2]_2)]_n$ |
| 10 | $(CH_2)_4[PH(p\text{-}ClC_6H_4)]_2$ | 0.632 | 14.1 | 0.640 | 14.3 | $(CH_2)_4[(p\text{-}ClC_6H_4)HP:BH_3]_2$ | 24 | 180 | $([CH_2]_4[(p\text{-}ClC_6H_4)PBH_2]_2)_n$ |
| 11 | $(CH_2)_4[PH(CH_2C_6H_5)]_2$ | 0.743 | 16.6 | 0.746 | 16.7 | $(CH_2)_4[(C_6H_5CH_2)HP:BH_3]_2$ | 25 | 190 | $([CH_2]_4[(C_6H_5CH_2)PBH_2]_2)_n$ |
| 12 | $(CH_2)_4[PH(i\text{-}C_3H_7)]_2$ | 0.891 | 19.0 | 0.896 | 20.1 | $(CH_2)_4[(i\text{-}C_3H_7)HP:BH_3]_2$ | 27 | 180 | $(CH_2)_4[(i\text{-}C_3H_7)PBH_2]_2)_n$ |
| 13 | $(CH_2)_5[PH(p\text{-}C_2H_5C_6H_4)]_2$ | 0.561 | 12.6 | 0.558 | 12.5 | $(CH_2)_5[(p\text{-}C_2H_5C_6H_4)HP:BH_3]_2$ | 2 | 220 | $(CH_2)_5[(p\text{-}C_2H_5C_6H_4)PBH_2])_n$ |
| 14 | $(CH_2)_4[PH(C_2H_5)]_2$ | 0.592 | 13.2 | 0.599 | 13.4 | $(CH_2)_4[(C_2H_5)HP:BH_3]_2$ | 2 | 220 | $([CH_2]_4[(C_2H_5)PBH_2]_2)_n$ |
| 15 | $p\text{-}C_6H_4[PH(CH_3)]_2$ | 0.510 | 11.4 | 0.517 | 11.6 | $p\text{-}C_6H_4[(CH_3)HP:BH_3]_2$ | 17 | 190 | $(p\text{-}C_6H_4[(CH_3)PBH_2])_n$ |
| 16 | $p\text{-}C_6H_4[PH(C_2H_5)]_2$ | 0.476 | 10.7 | 0.481 | 10.8 | $p\text{-}C_6H_4[(C_2H_5)HP:BH_3]_2$ | 4 | 220 | $(p\text{-}C_6H_4[(C_2H_5)PBH_2]_2)_n$ |
| 17 | $p\text{-}C_6H_4[PH(n\text{-}C_5H_{11})]_2$ | 0.590 | 13.2 | 0.584 | 13.1 | $p\text{-}C_6H_4[(n\text{-}C_5H_{11})HP:BH_3]_2$ | 15 | 190 | $(p\text{-}C_6H_4[(n\text{-}C_5H_{11})PBH_2]_2)_n$ |
| 18 | $p\text{-}C_6H_4[PH(C_6H_5)]_2$ | 0.431 | 9.6 | 0.426 | 9.5 | $p\text{-}C_6H_4[(C_6H_5)HP:BH_3]_2$ | 15 | 190 | $(p\text{-}C_6H_4[(C_6H_5)PBH_2]_2)_n$ |
| 19 | $p\text{-}C_6H_4[PH(n\text{-}C_{12}H_{25})]_2$ | 0.411 | 9.2 | 0.419 | 9.4 | $p\text{-}C_6H_4[(n\text{-}C_{12}H_{25})HP:BH_3]_2$ | 18 | 170 | $(p\text{-}C_6H_4[(n\text{-}C_{12}H_{25})PBH_2]_2)_n$ |
| 20 | $p\text{-}(C_6H_4)_2[PH(CH_3)]_2$ | 0.542 | 12.1 | 0.537 | 12.0 | $p\text{-}(C_6H_4)_2[(CH_3)HP:BH_3]_2$ | 20 | 180 | $(p\text{-}[C_6H_4]_2[(CH_3)PBH_2]_2)_n$ |
| 21 | $p\text{-}(C_6H_4)_3[PH(CH_3)]_2$ | 0.449 | 10.1 | 0.456 | 10.2 | $p\text{-}(C_6H_4)_3[(CH_3)HP:BH_3]_2$ | 16 | 180 | $(p\text{-}[C_6H_4]_3[(CH_3)PBH_2]_2)$ |

TABLE II
*Phosphinoborines from unsymmetrically substituted diphosphines—Pyrolysis process*

| No. | Diphosphine | Diphosphin mmols | Diphosphin cc. | Diboran mmols | Diboran cc. | Phosphine Borine Intermediate | Pyrolysis hrs. | Pyrolysis ° C. | Phosphinoborine Polymer Product |
|---|---|---|---|---|---|---|---|---|---|
| 22 | $(CH_3)HP(CH_2)_3PH(C_2H_5)$ | 0.611 | 13.7 | 0.620 | 13.9 | $H_3B:PH(CH_3)(CH_2)_3(C_2H_5)\text{-}HP:BH_3$ | 24 | 180 | $[H_2BPCH_3(CH_2)_3C_2H_5PBH_2]_n$ |
| 23 | $(CH_3)HP(CH_2)_3PH(n\text{-}C_3H_7)$ | 0.554 | 12.4 | 0.549 | 12.3 | $H_3B:PH(CH_3)(CH_2)_3(n\text{-}C_3H_7)HP:BH_3$ | 26 | 190 | $[H_2BPCH_3(CH_2)_3n\text{-}C_3H_7PBH_2]_n$ |
| 24 | $(C_2H_5)HP(CH_2)_6PH(n\text{-}C_5H_{11})$ | 0.598 | 13.4 | 0.589 | 13.2 | $H_3B:PH(C_2H_5)(CH_2)_6(n\text{-}C_5H_{11})HP:BH_3$ | 29 | 180 | $[H_2BPC_2H_5(CH_2)_6n\text{-}C_5H_{11}PBH_2]_n$ |
| 25 | $(CH_3)HP(CH_2)_2PH(n\text{-}C_8H_{17})$ | 0.531 | 11.9 | 0.539 | 12.1 | $H_3B:PH(CH_3)(CH_2)_2(n\text{-}C_8H_{17})HP:BH_3$ | 30 | 170 | $[H_2BPCH_3(CH_2)_2n\text{-}C_8H_{17}PBH_2]_n$ |
| 26 | $(C_2H_5)HP(CH_2)_4PH(i\text{-}C_3H_7)$ | 0.617 | 13.8 | 0.624 | 14.0 | $H_3B:PH(C_2H_5)(CH_2)_4(i\text{-}C_3H_7)HP:BH_3$ | 31 | 190 | $[H_2BPC_2H_5(CH_2)_4i\text{-}C_3H_7PBH_2]_n$ |
| 27 | $(C_6H_5)HP(CH_2)_3PH(p\text{-}C_6H_4CH_3)$ | 0.710 | 15.9 | 0.715 | 16.0 | $H_3B:PH(C_6H_5)(CH_2)_3(p\text{-}C_6H_4CH_3)HP:BH_3$ | 36 | 180 | $[H_2BP(C_6H_5)(CH_2)_3(p\text{-}C_6H_4CH_3)PBH_2]_n$ |
| 28 | $(CH_3)HP(CH_2)_3PH(n\text{-}C_8H_{17})$ | 0.477 | 10.7 | 0.471 | 10.5 | $H_3B:PH(CH_3)(CH_2)_3(n\text{-}C_8H_{17})HP:BH_3$ | 25 | 180 | $[H_2BPCH_3(CH_2)_3n\text{-}C_8H_{17}PBH_2]_n$ |
| 29 | $(CH_3)HP(p\text{-}C_6H_4)PH(C_2H_5)$ | 0.491 | 11.0 | 0.482 | 10.8 | $H_3B:PH(CH_3)(p\text{-}C_6H_4)(C_2H_5)HP:BH_3$ | 24 | 180 | $[H_2BPCH_3(p\text{-}C_6H_4)C_2H_5PBH_2]_n$ |
| 30 | $(CH_3)HP(p\text{-}C_6H_4)PH(n\text{-}C_3H_7)$ | 0.812 | 18.2 | 0.806 | 18.5 | $H_3B:PH(CH_3)(p\text{-}C_6H_4)(n\text{-}C_3H_7)HP:BH_3$ | 25 | 180 | $[H_2BPCH_3(p\text{-}C_6H_4)n\text{-}C_3H_7PBH_2]_n$ |

In the following tables conditions are set forth taken from runs wherein the alternative method is employed, that wherein phosphinoborines are prepared using difunctional phosphines, said phosphinoborines having, in some cases, various hydrocarbon radicals bonded to the boron atoms and, in others, one or two hydrogen atoms depending from the phosphorus. The dehydrohalogenation process is preferably employed when such phosphinoborines are desired since this method does not necessitate high temperatures which tend to disproportionate phosphine borines having one or more hydrocarbon substituents on the boron and which tend to drive off any hydrogens bonded to the phosphorus, thus causing excessive cross-linking between adjacent P and B atoms. The process employing the dehydrohalogenation reaction, as already set forth in Example 1 above may be generally represented as follows:

$n'R'(H)PRP(H)R''+2n'R'''R''''BX \longrightarrow$

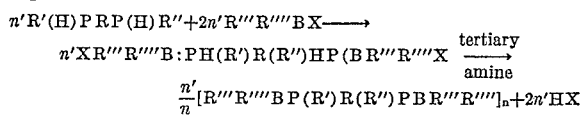

$\frac{n'}{n}[R'''R''''BP(R')R(R'')PBR'''R'''']_n+2n'HX$ where R', R'', R''' and R'''' are the same or different and are H or hydrocarbon radicals, R represents a phenylene, polyphenylene, methylene or polymethylene radical.

process outlined in Tables III and IV is analogous to the phosphinoborine product secured, it being distinguished by the presence of the appropriate halogen on either boron, a hydrogen atom on either phosphorus, its non-polymeric nature, and by the presence of a covalent bond linking the P and B atoms.

Each of the phosphinoborines described in Tables III and IV were prepared in nitrogen-flushed 85 ml. tubes. Specifically, the phosphine borine addition reactions were effected by condensing all reactants used in any given run together in the evacuated reaction tube, the latter being cooled to −196° C. in a liquid nitrogen bath. The reaction vessel contents were then allowed to warm sufficiently to initiate the vigorous quantitative reaction. Thereafter, the tube was allowed to warm to room temperature, about 25° C., and permitted to stand overnight, a period of 15–18 hours. The tube was then opened and the precipitated ternary ammonium salt filtered off. The filter cake was washed several times (four to five) with solvent and the solvent thereafter distilled off under a partial vacuum. Benzene served as the solvent (20–40 ml. sufficed in each case) in the runs set out in Examples 40–47, 52–54, and 58–64. In all other instances 20–40 ml. diethyl ether was used.

As can be seen from the foregoing examples, the

TABLE III

*Phosphinoborines from symmetrically substituted diphosphines—Dehydrohalogenation process*

| No. | Diphosphine | Diphosphine mmols | Diphosphine cc. | Haloborine | Haloborine mmols | Haloborine cc. | Triethylamine, g. | Dehydrohalogenation Process Phosphinoborine Product |
|---|---|---|---|---|---|---|---|---|
| 31 | $(CH_2)_3[PH(CH_3)]_2$ | 0.817 | 18.3 | $(CH_3)_2BBr$ | 1.612 | 36.1 | 0.165 | $\{[CH_2]_3[(CH_3)PB(CH_3)_2]_2\}_n$ |
| 32 | $(CH_2)_3(PH_2)_2$ | 0.642 | 14.4 | $(CH_3)_2BBr$ | 1.302 | 29.2 | 0.133 | $\{[CH_2]_3[HPB(CH_3)_2]_2\}_n$ |
| 33 | $(CH_2)_4[PH(C_2H_5)]_2$ | 0.787 | 17.6 | $(C_2H_5)_2BCl$ | 1.561 | 35.4 | 0.159 | $\{[CH_2]_4[(C_2H_5)PB(C_2H_5)_2]_2\}_n$ |
| 34 | $CH_2[PHCH_3]_2$ | 0.814 | 18.2 | $(n-C_4H_9)_2BBr$ | 1.618 | 36.2 | 0.165 | $\{CH_2[CH_3PB(n-C_4H_9)_2]\}_n$ |
| 35 | $(CH_2)_5[PH(n-C_4H_9)]_2$ | 0.693 | 15.5 | $(CH_3)_2BI$ | 1.374 | 30.8 | 0.140 | $\{[CH_2]_5[(n-C_4H_9)PB(CH_3)_2]_2\}_n$ |
| 36 | $(CH_2)_4[PH(n-C_8H_{17})]_2$ | 0.747 | 16.7 | $(C_6H_5)_2BBr$ | 1.504 | 33.6 | 0.153 | $\{[CH_2]_4[(n-C_8H_{17})PB(C_6H_5)_2]_2\}_n$ |
| 37 | $(CH_2)_3[PH(C_6H_5)]_2$ | 0.691 | 15.5 | $CH_3(C_2H_5)BBr$ | 1.364 | 30.6 | 0.139 | $\{[CH_2]_3[(C_6H_5)PB(C_2H_5)CH_3]_2\}_n$ |
| 38 | $(CH)_4[PH(p-CH_3C_6H_4)]_2$ | 0.516 | 11.6 | $(CH_3)_2BCl$ | 1.048 | 23.4 | 0.107 | $\{[CH_2]_4[(p-CH_3C_6H_4)PB(CH_3)_2]_2\}_n$ |
| 39 | $p-C_6H_4[PH(CH_3)]_2$ | 0.891 | 20.0 | $CH_3(n-C_4H_9)BI$ | 1.798 | 40.2 | 0.184 | $\{p-C_6H_4[(CH_3)PB(n-C_4H_9)CH_3]_2\}_n$ |
| 40 | $p-C_6H_4(PH_2)_2$ | 0.639 | 14.3 | $(C_6H_{11})_2BBr$ | 1.262 | 28.2 | 0.129 | $\{p-C_6H_4[HPB(C_6H_{11})_2]_2\}_n$ |
| 41 | $p-C_6H_4[PH(C_2H_5)]_2$ | 0.661 | 14.8 | $(n-C_8H_{17})_2BBr$ | 1.334 | 29.8 | 0.136 | $\{p-C_6H_4[(C_2H_5)PB(n-C_8H_{17})_2]_2\}_n$ |
| 42 | $p-C_6H_4[PH(n-C_8H_{17})]_2$ | 0.622 | 13.9 | $(CH_3)_2BBr$ | 1.260 | 28.2 | 0.129 | $\{p-C_6H_4[(n-C_8H_{17})PB(CH_3)_2]_2\}_n$ |
| 43 | $p-C_6H_4[PH(C_6H_5)]_2$ | 0.731 | 16.4 | $(C_6H_5)_2BBr$ | 1.464 | 32.4 | 0.149 | $\{p-C_6H_4[(C_6H_5)PB(C_6H_5)_2]_2\}_n$ |
| 44 | $p-C_6H_4[PH(p-C_6H_4C_6H_5)]_2$ | 0.501 | 11.2 | $(CH_3)_2BBr$ | 0.982 | 22.0 | 0.100 | $\{p-C_6H_4(p-C_6H_4C_6H_5)PB(CH_3)_2]_2\}_n$ |
| 45 | $p-C_6H_4[PH(i-C_{10}H_7)]_2$ | 0.560 | 12.5 | $(C_2H_5)_2BCl$ | 1.108 | 24.8 | 0.113 | $\{p-C_6H_4[(i-C_{10}H_7)PB(C_2H_5)_2]_2\}_n$ |

TABLE IV

*Phosphinoborines from unsymmetrically substituted diphosphines—Dehydrohalogenation process*

| No. | Diphosphine | Diphosphine mmoles | Diphosphine cc. | Haloborine | Haloborine mmoles | Haloborine cc. | Triethylamine, g. | Phosphinoborine Product |
|---|---|---|---|---|---|---|---|---|
| 46 | $CH_3HP(CH_2)_3PH_2$ | 0.601 | 13.5 | $(CH_3)_2BBr$ | 1.205 | 27.0 | 0.122 | $[(CH_3)_2BP(CH_3)(CH_2)_3HPB(CH_3)_2]_n$ |
| 47 | $C_2H_5HP(CH_2)_6PH_2$ | 0.742 | 16.6 | $(CH_3)_2BBr$ | 1.491 | 33.4 | 0.151 | $[(CH_3)_2BP(C_2H_5)(CH_2)_6HPB(CH_3)_2]_n$ |
| 48 | $C_2H_5HP(CH_2)_3PHCH_3$ | 0.591 | 13.2 | $(C_2H_5)_2BCl$ | 1.190 | 26.7 | 0.120 | $[(C_2H_5)_2BP(C_2H_5)(CH_2)_3(CH_3)PB(C_2H_5)_2]_n$ |
| 49 | $n-C_3H_7HP(CH_2)_3PHCH_3$ | 0.941 | 21.1 | $(CH_3)_2BI$ | 1.901 | 42.6 | 0.192 | $[(CH_3)_2BP(n-C_3H_7)(CH_2)_3(CH_3)PB(CH_3)_2]_n$ |
| 50 | $n-C_5H_{11}HP(CH_2)_4PH_2$ | 0.467 | 10.5 | $(C_6H_5)_2BBr$ | 0.944 | 21.1 | 0.096 | $[(C_6H_5)_2BP(n-C_5H_{11})(CH_2)_4HPB(C_6H_5)_2]_n$ |
| 51 | $C_2H_5HP(CH_2)_4PHCH_3$ | 0.528 | 11.8 | $n-C_3H_7(CH_3)BBr$ | 1.059 | 23.7 | 0.107 | $[CH_3(n-C_3H_7)BP(C_2H_5)(CH_2)_4(CH_2)PB(CH_3)(n-C_3H_7)]_n$ |
| 52 | $CH_3HP(CH_2)_3PH_2$ | 0.677 | 15.2 | $(2-C_{10}H_7)_3BBr$ | 1.350 | 30.2 | 0.137 | $[(2-C_{10}H_7)_2BP(CH_3)(CH_2)_3HPB(2-C_{10}H_7)_2]_n$ |
| 53 | $n-C_8H_{17}HP(CH_2)_3PHC_2H_5$ | 0.912 | 20.4 | $n-C_8H_{17})BBr$ | 1.802 | 40.3 | 0.182 | $[CH_3(C_2H_5)BP(n-C_8H_{17})(CH_2)_3(C_2H_5)PB(C_2H_5)CH_3]_n$ |
| 54 | $n-C_{12}H_{25}HP(CH_2)_3PHCH_3$ | 0.759 | 16.9 | $(CH_3)_2BBr$ | 1.512 | 33.9 | 0.153 | $[(CH_3)_2BP(n-C_{12}H_{25})(CH_2)_3(CH_3)PB(CH_3)_2]_n$ |
| 55 | $CH_3HP(CH_2)_4PH_2$ | 0.791 | 17.7 | $(n-C_8H_{17})_2BBr$ | 1.594 | 35.7 | 0.161 | $[(n-C_8H_{17})_2BP(CH_3)(CH_2)_4HPB(n-C_8H_{17})_2]_n$ |
| 56 | $C_2H_5HP(CH_2)_3PH(n-C_4H_9)$ | 0.868 | 19.4 | $CH_3(C_2H_5)BCl$ | 1.730 | 38.8 | 0.175 | $[CH_3(C_2H_5)BP(C_2H_5)(CH_2)_3(n-C_4H_9)PB(C_2H_5)CH_3]_n$ |
| 57 | $n-C_3H_7HP(CH_2)_3PHCH_3$ | 0.714 | 16.0 | $(CH_3)_2BBr$ | 1.431 | 32.1 | 0.145 | $[(CH_3)_2BP(n-C_3H_7)(CH_2)_3(CH_3)PB(CH_3)_2]_n$ |
| 58 | $CH_3HP(CH_2)_3PHC_2H_5$ | 0.683 | 15.3 | $(p-CH_3C_6H_4)_2BBr$ | 1.358 | 30.4 | 0.137 | $[(p-CH_3C_6H_4)_2BP(CH_3)(CH_2)_3(C_2H_5)PB(p-CH_3C_6H_4)_2]_n$ |
| 59 | $i-C_3H_7HP(CH_2)_3PHCH_3$ | 0.634 | 14.2 | $(i-C_3H_7)_2BBr$ | 1.274 | 28.5 | 0.129 | $[(i-C_3H_7)_2BP(i-C_3H_7)(CH_2)_3(CH_3)PB(i-C_3H_7)_2]_n$ |
| 60 | $CH_3HP(p-C_6H_4)PH_2$ | 0.796 | 17.8 | $(CH_3)_2BBr$ | 1.598 | 35.8 | 0.162 | $[(CH_3)_2BP(CH_3)(p-C_6H_4)HPB(CH_3)_2]_n$ |
| 61 | $CH_3HP(p-C_6H_4)PH(n-C_4H_9)$ | 0.615 | 13.8 | $CH_3(C_2H_5)BBr$ | 1.234 | 27.6 | 0.125 | $[CH_3(C_2H_5)PB(CH_3)(p-C_6H_4)(n-C_4H_9)PB(C_2H_5)CH_3]_n$ |
| 62 | $C_2H_5HP(p-C_6H_4)PHCH_3$ | 0.707 | 15.8 | $(CH_3)_2BBr$ | 1.421 | 31.8 | 0.144 | $[(CH_3)_2BP(C_2H_5)(p-C_6H_4)(CH_3)PB(CH_3)_2]_n$ |

Space limitations required omitting the column labeled "Phosphine Borine Intermediate" from Tables III and IV, but it is to be understood that such an intermediate is formed when employing an unsymmetrical diphosphine in fashion analogous to that seen in the data set out in the preceding tables. The phosphine borine intermediate secured (though generally not isolated) using any given products of this invention may be prepared through the pyrolysis reaction set forth above wherein a phosphine borine is prepared and thereafter heated to cause the evolution of hydrogen. The alternative reaction may be used, that wherein a tertiary amine was used to combine with the hydrohalogen acid removed by dehalogenation of a phosphine haloborine. The hydrohalogen acid combines with a tertiary amine to form a substituted ammonium salt.

The phosphine borine materials used in the examples set forth above may be prepared in accordance with the procedures set forth in our abandoned application, Serial No. 446,148, filed July 27, 1954, titled, "Phosphine Borine Compounds and Their Preparation."

The phosphinoborine polymers of this invention having substantially no free H atoms depending from the P atom of a phosphinoborine unit due to the presence of more than a single phosphorus atom are highly cross-linked and hence insoluble (see Example 2). They display excellent dielectric properties and are thermally resistant (note Example 3). Thus they find utility where thermally and chemically resistant dielectrics are required. Also, they are suitable for use as gaskets, laminating resins and as coatings where high temperature service is encountered. Where free hydrogen atoms depend from the phosphorus of PB groups, it is necessary to replace such H atoms with alkyl groups as set forth in our copending application, Serial No. 678,429, filed August 15, 1957, whereby to improve the thermal stability of the product. The presence of such free H atoms renders the product unstable.

Obviously, other modifications and variations of this invention as hereinbefore set forth may be made without departing from the spirit and scope thereof and, accordingly, only those limitations should be imposed as are indicated in the appended claims. For example, the invention is not limited to polymers of individual phosphinoborines but includes copolymers between different of the compounds, the method of preparation of such materials being that set forth above for individual phosphinoborines excepting that mixtures of precursors are prepared at the outset. Also, difunctional phosphine borines and phosphine borines containing only a single phosphorus atom may be mixed or prepared as an admixture and thereafter pyrloyzed or dehydrohalogenated, whichever may be necessary, whereby to produce a polymer wherein units of various phosphinoborine materials, at least a portion of which are difunctional, are bonded to adjacent units, e.g. Example 3.

In short, the phosphinoborine units of this invention may be combined with any of the other varieties of phosphinoborine units to which our copending applications are directed. Such other phosphinoborines are disclosed in the following copending applications: Serial No. 678,429, filed August 15, 1957; Serial No. 666,204, Serial No. 666,205, Serial No. 666,213, Serial No. 666,206, all filed June 17, 1957, and Serial No. 680,625, filed August 27, 1957, all bearing the title "Phosphinoborine Compounds and Their Preparation." Obviously, the degree to which the polymeric products exhibit the properties peculiar to the phosphinoborines of this invention will depend upon the degree to which these particular phosphinoborines are "diluted"—that is, variations in the ratios of the phosphinoborines of this invention to other varieties will directly influence the properties of the product obtained.

We claim:

1. A phosphinoborine polymer composed of phosphinoborine monomeric units, said units having the general formula

[R"$_2$BP(R')R(R')PBR"$_2$]

wherein R is selected from the class consisting of phenylene, methylene and polymethylene, wherein R' is selected from the class consisting of aromatic radicals and aliphatic radicals and wherein R" is selected from the class consisting of H, aromatic radicals and aliphatic radicals, each of said monomeric units being linked to two adjacent monomeric units by means of boron-to-phosphorus bonds to form a cyclic polymer having the structure:

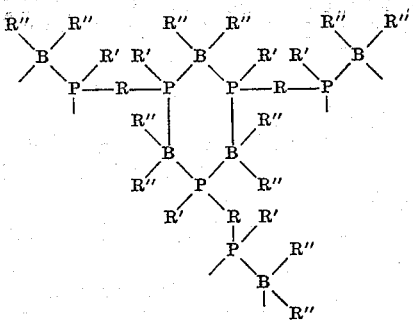

where the additional boron valence requirements are satisfied by a phosphorus of an adjacent of said monomeric units and the additional phosphorus valence requirements are satisfied by the boron of an adjacent of said monomeric units.

2. The polymer of claim 1 wherein R is (CH$_2$)$_3$, R' is CH$_3$ and R" is H.

3. The polymer of claim 1 wherein R is (CH$_2$)$_7$, R' is C$_6$H$_5$ and R" is H.

4. The polymer of claim 1 wherein R is C$_6$H$_4$, R' is CH$_3$ and R" is H.

5. The polymer of claim 1 wherein R is C$_6$H$_4$, R' is C$_6$H$_5$ and R" is H.

6. The polymer of claim 1 wherein R is (CH$_2$)$_3$, R' is CH$_3$ and R" is CH$_3$.

7. The polymer of claim 1 wherein R is C$_6$H$_4$, R' is C$_2$H$_5$ and CH$_3$ and R" is H.

8. A process for the preparation of a phosphinoborine polymer comprising reacting a phosphine borine having the formula

XR"$_2$B:PH(R')R(R')HP:BR"$_2$X wherein X represents a halogen selected from the class consisting of chlorine, bromine and iodine, wherein R is selected from the class consisting of phenylene, methylene and polymethylene, wherein R' is selected from the class consisting of aromatic radicals and aliphatic radicals and wherein R" is selected from the class consisting of H, aromatic radicals and aliphatic radicals, with a tertiary amine.

9. A process for the preparation of a phosphinoborine polymer comprising pyrolyzing at between about 80° C. and 350° C. a phosphine borine of the formula

H$_3$B:PH(R')R(R')HP:BH$_3$ wherein R is selected from the class consisting of methylene, phenylene and polymethylene and wherein R' is selected from the class consisting of aromatic radicals and aliphatic radicals.

10. A process for the preparation of a phosphinoborine polymer comprising pyrolyzing at a temperature of between about 80° and 350° C. a phosphine borine of the formula (CH$_2$)$_3$[CH$_3$HP:BH$_3$]$_2$ 11. A process for the preparation of a phosphinoborine polymer comprising pyrolyzing at a temperature of between about 80° and 350° C. a phosphine borine of the formula (CH$_2$)$_7$[C$_6$H$_5$HP:BH$_3$]$_2$ 12. A process for the preparation of a phosphinoborine polymer comprising pyrolyzing at a temperature of between about 80° and 350° C. a phosphine borine of the formula

C$_6$H$_4$[CH$_3$HP:BH$_3$]$_2$

13. A process for the preparation of a phosphinoborine polymer comprising pyrolyzing at a temperature of between about 80° and 350° C. a phosphine borine of the formula

C$_6$H$_4$[C$_6$H$_5$HP:BH$_3$]$_2$

14. A process for the preparation of a phosphinoborine polymer comprising reacting a phosphine haloborine having the formula $$[CH_2]_3[(CH_2)HP:BBr(CH_3)_2]_2$$

with a tertiary amine.

15. A process for the preparation of a phosphinoborine polymer comprising reacting a phosphine haloborine having the formula $$(CH_3)_2BrB:PH(C_2H_5)(p\text{-}C_6H_4)(CH_3)HP:BBr(CH_3)_2$$

with a tertiary amine.

16. A process for the preparation of a phosphinoborine copolymer comprising pyrolyzing at between about 80° and 350° C. a mixture of a phosphine borine of the formula $$H_3B:PH(R')R(R')HP:BH_3$$

and a phosphine borine of the formula $R'''_2HP:BH_3$ wherein R is selected from the class consisting of methylene, phenylene and polymethylene and wherein R' and R''' are selected from the class consisting of aromatic radicals and aliphatic radicals.

17. A phosphinoborine copolymer composed of phosphinoborine monomeric units of the formula $$H_2BP(R')R(R')PBH_2$$

and phosphinoborine monomeric units of the formula $[R'''_2PBH_2]$ wherein R is selected from the class consisting of phenylene, methylene and polymethylene and wherein R' and R''' are selected from the class consisting of aromatic radicals and aliphatic radicals, each of said monomeric units being linked to adjacent monomeric units by means of boron-to-phosphorus bonds.

No references cited.